United States Patent
Takahashi

(10) Patent No.: US 6,370,200 B1
(45) Date of Patent: Apr. 9, 2002

(54) DELAY ADJUSTING DEVICE AND METHOD FOR PLURAL TRANSMISSION LINES

(75) Inventor: Satoshi Takahashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/127,893

(22) Filed: Aug. 3, 1998

(30) Foreign Application Priority Data

Aug. 4, 1997 (JP) .............................. 9-209347

(51) Int. Cl.[7] .............................. H04B 3/00
(52) U.S. Cl. .................. 375/257; 375/354; 714/700; 327/237
(58) Field of Search ................. 375/257, 259, 375/377, 354; 327/237; 714/700

(56) References Cited

U.S. PATENT DOCUMENTS

| 4,714,924 A | * | 12/1987 | Ketzler | 340/825.21 |
| 5,043,596 A | * | 8/1991 | Masuda et al. | 307/262 |
| 5,087,829 A | * | 2/1992 | Ishibashi et al. | 307/269 |
| 5,426,644 A | * | 6/1995 | Fujimoto | 370/112 |
| 5,451,894 A | * | 9/1995 | Guo | 327/241 |
| 5,621,774 A | * | 4/1997 | Ishibashi et al. | 375/371 |
| 6,078,623 A | * | 6/2000 | Isobe et al. | 375/259 |

FOREIGN PATENT DOCUMENTS

| JP | 04058631 | 2/1992 |
| JP | 04223728 | 8/1992 |
| JP | 05063685 | 3/1993 |
| JP | 05110550 | 4/1993 |

* cited by examiner

Primary Examiner—Don N. Vo
(74) Attorney, Agent, or Firm—McDermott, Will & Emery

(57) ABSTRACT

In simultaneous transmission of a signal using plural transmission lines, a synchronous cycle is set, plural signals A, B, C and D are simultaneously transmitted to the plural transmission lines, and the plural signals A through D transmitted through the plural transmission lines are received. Delay times τA, τB, τC and τD of the plural signals received in the synchronous cycle are detected, and the delay times of the transmission lines are adjusted on the basis of these detected delay times so that the simultaneously output signals A through D can be simultaneously received after passing through the plural transmission lines. Accordingly, even when a delay time between signals is long with a phase shift exceeding one cycle of a clock signal, the phase shift between the signals can be adjusted to be within one cycle.

14 Claims, 14 Drawing Sheets

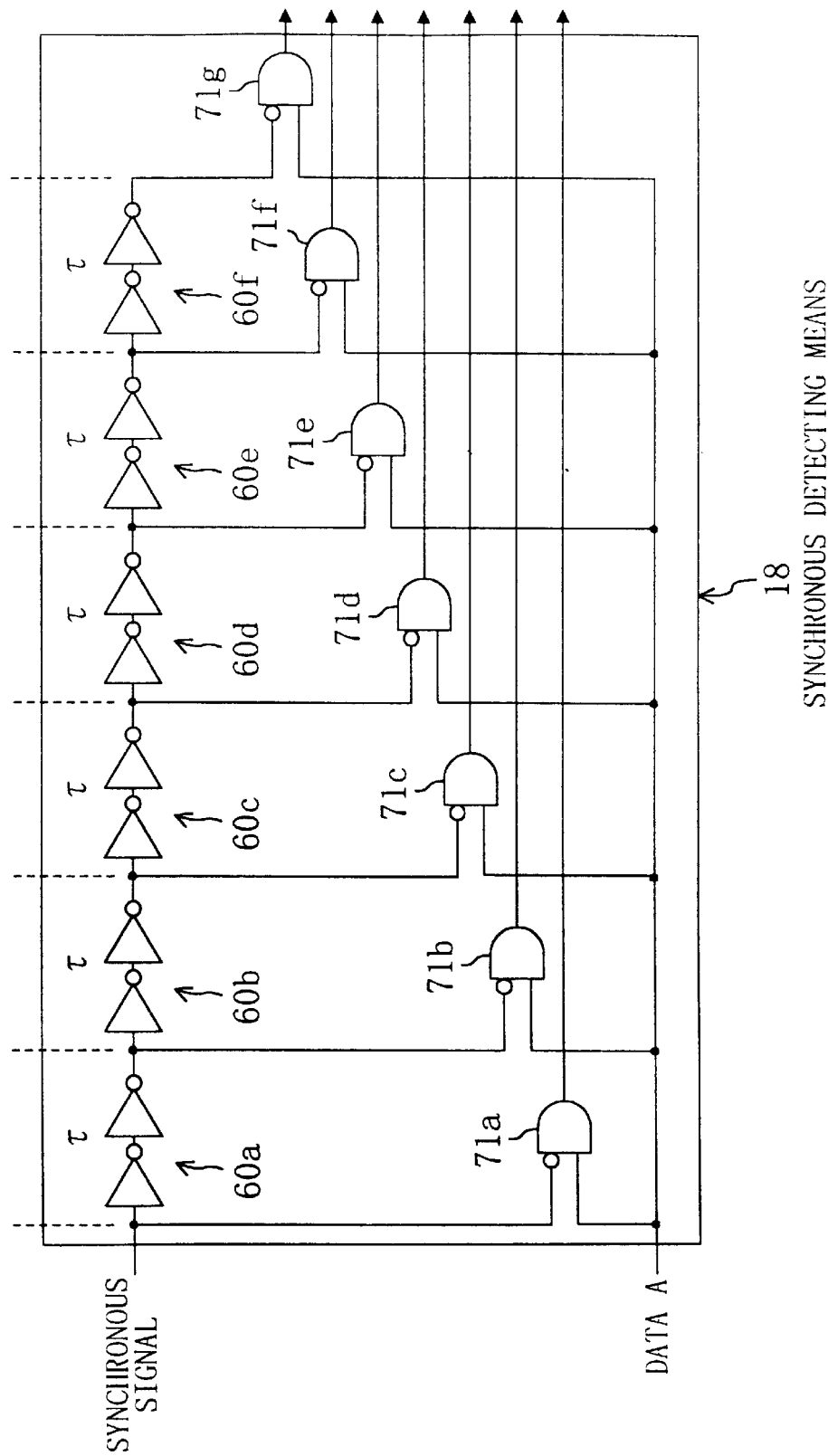

DELAY ADJUSTING DEVICE AND METHOD FOR PLURAL TRANSMISSION LINES

BACKGROUND OF THE INVENTION

The present invention relates to improvement of a delay adjusting device and an improved delay adjusting method adopted for adjusting different delay times of plural transmission lines in rapid signal transmission where plural signals are simultaneously transmitted through the plural transmission lines.

In general, plural signal transmission lines have mutually different signal transmission delay times, and hence, skew is caused between transmitted signals. For example, when plural data are transmitted to one and the same receiver part, there arises a time difference in the receipt of these data at the receiver part. Also, when the same signal (such as a clock signal) is transmitted to plural receiver parts, there arises a time difference in the receipt of the signal at the respective receiver parts. Such skew is caused both in the case where a signal is transmitted within one LSI and in the case where a signal is transmitted between plural LSIs. The occurrence of the skew can lead to malfunction of the LSI.

Therefore, as is disclosed in, for example, Japanese Laid-Open Patent Publication No. 7-73118, a synchronous circuit is conventionally provided, so that, when a phase shift is caused between signals received through different transmission lines, the phase shift between the signals can be absorbed and adjusted by using a signal on the latest transmission line as a reference and providing the other transmission lines with predetermined delay devices.

As another conventional technique, as is disclosed in, for example, Japanese Laid-Open Patent Publication No. 6-54016, in the case where plural data are transmitted by using transmission lines in the same number as the number of the data, timing of fetching these data by receiver parts (flip-flops), namely, input timing of a clock signal to these flip-flops, is made adjustable. Thus, a clock signal is input after receiving all the data, thereby allowing the plural data to be received at the same time at the receiver parts.

As a result of recent increase of the operation speed of LSIs and the like, some LSIs require rapid signal transmission with a transmission rate of 550 MB/sec. (namely, 250 MHZ) or more in parallel data transmission using plural transmission lines. For example, in signal transmission with a transmission rate of 500 MHZ, one cycle has a length of 2 nanoseconds or less.

However, in LSIs and the like operated at such a high speed, any of the aforementioned conventional techniques cannot be adopted for adjusting a phase shift due to the signal skew for the following reason:

In the former conventional technique, a phase difference between waveforms of signals received at plural receiver parts is detected. Therefore, with one cycle of a clock signal indicated as T, when a phase shift between waveforms of received signals is smaller than T/2, the phase shift can be adjusted. However, in three signals A, B and C as is shown in FIG. 14(a), when a phase shift between the signals A and C is T+τ2, namely, larger than T/2, the signal C is adjusted to be shifted from the signal A by one cycle T as is shown in FIG. 14(b). When there is a length difference of, for example, 10 cm between the transmission lines, a phase shift of 2 nanoseconds is caused with a load of 40 pF, and this phase shift exceeds one cycle in the aforementioned signal transmission with a rate of 500 MHZ. Thus, it would be understood that such a situation can be easily presumed.

Alternatively, in the latter conventional technique, the receiving timing of the clock signal is adjusted so that the clock signal can be received after receiving the plural data. Therefore, in the case where a phase shift of any of the data exceeds one cycle, at the receipt of this data, the other data can be changed to have values of a subsequent cycle. Accordingly, the data fetching timing of the flip-flops cannot be adjusted to be simultaneous. In this manner, it is impossible to overcome the problem of the signal skew in high speed LSIs and the like by using any of the aforementioned two conventional techniques.

SUMMARY OF THE INVENTION

The object of the invention is, in signal transmission by using plural transmission lines in a rapidly operated LSI or the like where a signal is simultaneously transmitted through the transmission lines, adjusting phase shifts between signals on all the transmission lines satisfactorily even when the signal transmission delay time of any of the transmission lines exceeds one cycle, thereby adjusting signal skew within the same cycle.

In order to achieve the aforementioned object, according to the invention, in parallel signal transmission by using plural transmission lines, a predetermined synchronous cycle is executed with transmission of primary signals necessary for the operation of a circuit halted, and phase shifts between the signals on the respective transmission lines are detected by using a predetermined time as a reference. Thus, even when Adhere is a phase shift exceeding one cycle between the signals received through the transmission lines, the phase shift can be appropriately adjusted and the signal skew can be adjusted within the same cycle.

Specifically, the adjusting device of this invention for delay times between plural transmission lines comprises a signal output unit; plural transmission lines connected with the signal output unit for simultaneously transmitting an output signal of the signal output unit; a signal receiver unit for receiving signals on the plural transmission lines; plural timing adjusting means disposed on plural paths from the signal output unit through the plural transmission lines to the signal receiver unit for adjusting signal transmission delay times of the transmission lines; synchronous cycle setting means for setting a predetermined synchronous cycle; delay time detecting means for detecting delay times between the signals on the transmission lines simultaneously output from the signal output unit and received by the signal receiver unit within the synchronous cycle set by the synchronous cycle setting means; and control means for controlling the plural timing adjusting means on the basis of the delay times between the signals on the transmission lines detected by the delay time detecting means.

In one aspect of the adjusting device for delay times between plural transmission lines, the control means includes delay time determining means for determining delay times to be respectively inserted into the transmission lines which make the signal receiver unit simultaneously receive the signals on the transmission lines on the basis of the delay times between the signals on the transmission lines detected by the delay time detecting means; and delay value setting means for controlling the plural timing adjusting means so as to insert the delay times determined by the delay time determining means into the corresponding transmission lines.

In another aspect of the adjusting device for delay times between plural transmission lines, the synchronous cycle setting means sets the synchronous cycle at a predetermined time interval.

In still another aspect of the adjusting device for delay times between plural transmission lines, the signals are transmitted to the transmission lines with parity provided, and the synchronous cycle setting means detects a transmission error in a signal received by the signal receiver unit and sets the synchronous cycle when the transmission error is detected.

In still another aspect, a temperature sensor is disposed at least in one of the signal output unit, the signal receiver unit and the plural transmission lines, and the synchronous cycle setting means sets the synchronous cycle when the temperature sensor detects a temperature change exceeding a predetermined value.

In still another aspect, the synchronous cycle setting means sets the synchronous cycle by transmitting a synchronous signal to an additionally provided dedicated transmission line.

In still another aspect, the synchronous cycle setting means sets the synchronous cycle by fixing the signals simultaneously transmitted through the plural transmission lines at a predetermined potential level during a predetermined period.

In still another aspect, signal transmission between the signal output unit and the signal receiver unit is performed in accordance with a predetermined protocol, and the synchronous cycle setting means sets the synchronous cycle by outputting the protocol.

In still another aspect, the plural timing adjusting means respectively include plural delay devices and a selecting circuit for selecting a combination of the delay devices.

In still another aspect, the plural timing adjusting means are provided in the same number as the number of the plural transmission lines, with each timing adjusting means disposed on the corresponding transmission line.

In still another aspect, the delay time detecting means uses, as a reference, a signal on one transmission line received in the synchronous cycle by the signal receiver unit the last among the signals simultaneously output from the signal output means and received by the signal receiver unit, and detects delay times between the reference signal and the other signals on the other transmission lines.

In still another aspect, output of the output signal from the signal output unit is performed in accordance with a clock signal, and a period of the synchronous cycle set by the synchronous cycle setting means exceeds one cycle of the clock signal.

Alternatively, the method of this invention of adjusting delay times between plural transmission lines comprises the steps of setting a synchronous cycle as a cycle for synchronizing signals on plural transmission lines; simultaneously transmitting an output signal of a signal output unit to the plural transmission lines and receiving the signals on the plural transmission lines by a signal receiver unit in the synchronous cycle; detecting delay times between the signals on the transmission lines received by the signal receiver unit in the synchronous cycle; and adjusting delay times of the transmission lines on the basis of the detected delay times so that the signals on the transmission lines simultaneously output from the signal output unit are simultaneously received by the signal receiver unit.

In one aspect of the method of adjusting delay times between plural transmission lines, a period of the synchronous cycle exceeds one cycle of a clock signal.

In this manner, according to the invention, in parallel transmission of one or more signals by using plural transmission lines, a predetermined synchronous cycle is executed and the signals are simultaneously transmitted from a signal output unit to the plural transmission lines in the synchronous cycle. A signal receiver unit receives the signals through the transmission lines, and delay time detecting means detects the delay times between the signals received through the transmission lines. At this point, since the delay times between the signals transmitted through the transmission lines in the synchronous cycle are detected with the period of the synchronous cycle defined as a period exceeding one cycle of a clock signal (for example, plural cycles of the clock signal), even when the signal transmission delay time of any of the transmission lines is so long that it exceeds one cycle, the signals received through the plural transmission lines can be synchronized in the same cycle.

BRIEF DESCRIPTION OF THE DRAWINGS

FIG. 3 is a diagram for showing the configuration of synchronous detecting means of the embodiment;

DETAILED DESCRIPTION OF THE INVENTION

Now, preferred embodiments of the invention will be described with reference to the accompanying drawings.

Figure 1:
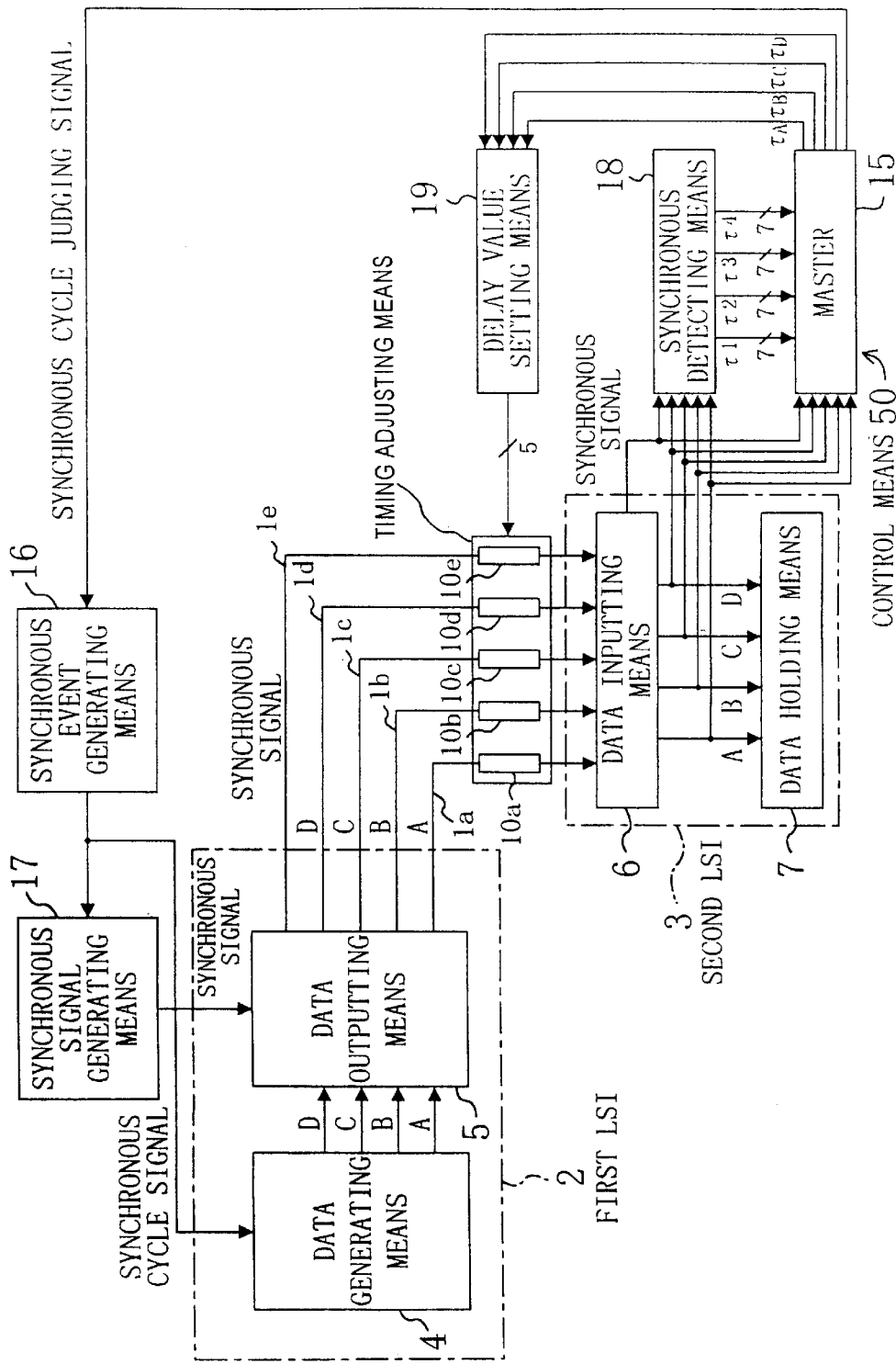
FIG. 1 is a diagram for showing the entire configuration of an adjusting device for delay times between plural transmission lines according to one embodiment of the invention.

FIG. 1 is a diagram of an adjusting device for delay times between plural transmission lines according to an embodiment of the invention.

In FIG. 1, reference numerals 1a through 1e denote first through fifth transmission lines, and reference numerals 2 and 3 denote first and second LSIs mutually connected through the transmission lines 1a through 1e. The first LSI 2 comprises data generating means 4 including, for example, a processor or a DSP for simultaneously generating four data and data outputting means (signal output unit) 5 for outputting the data (signals) generated by the data generating means 4 to the four transmission lines 1a through 1d excluding the fifth transmission line 1e among the five transmission lines. The data outputting means 5 outputs a synchronous signal to the fifth transmission line 1e as described below.

On the other hand, the second LSI 3 comprises data inputting means (data receiver unit) 6 for receiving the data transmitted through the first through fourth transmission lines 1a through 1d and the synchronous signal transmitted through the fifth transmission line 1e and data holding means 7 for holding the received four data. The data holding means 7 includes, for example, a memory.

Figure 2A:
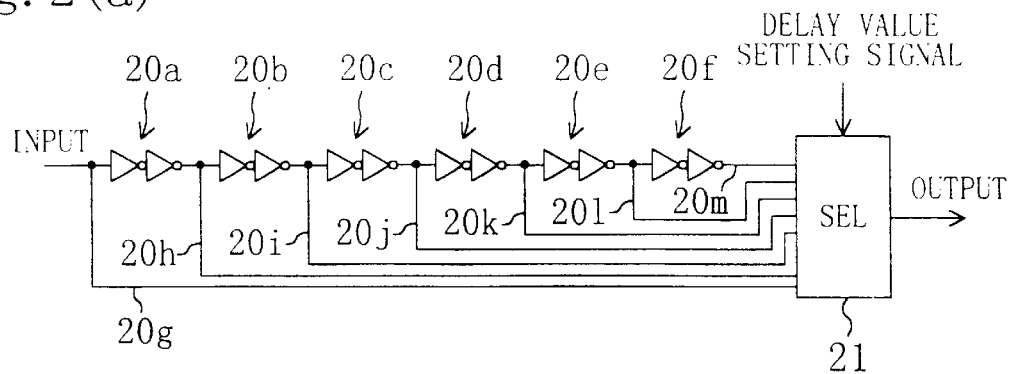
FIG. 2(a) is a diagram for showing a configuration of a timing adjusting mechanism of the embodiment.
Figure 2B:
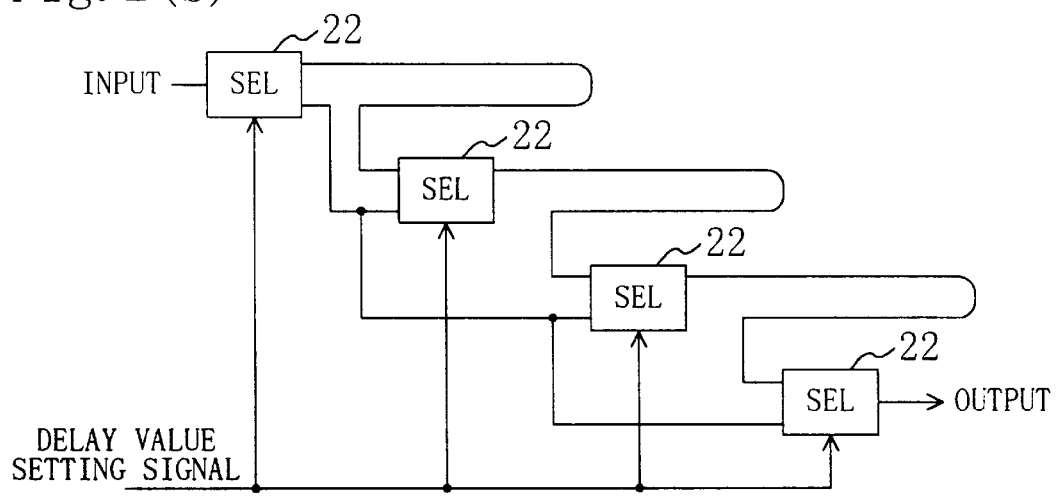
FIG. 2(b) is a diagram for showing another configuration of the timing adjusting mechanism.
Figure 2C:
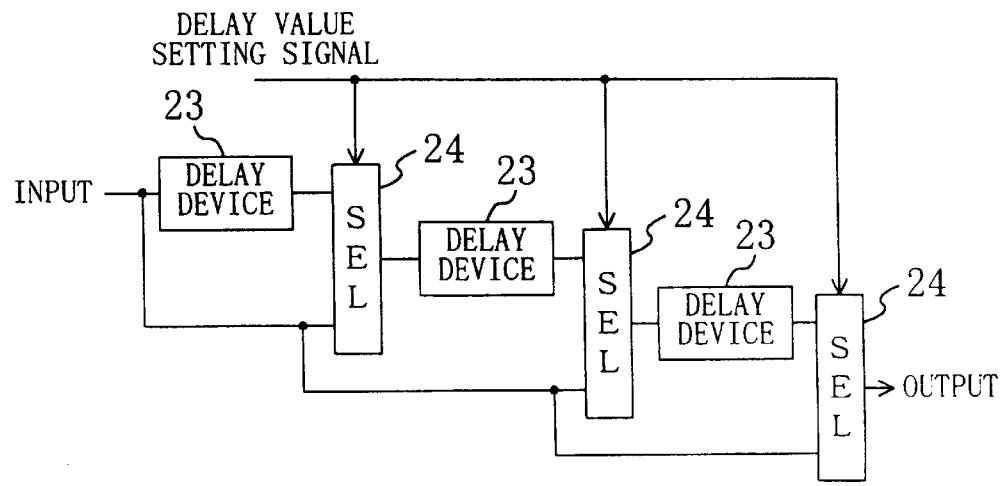
FIG. 2(c) is a diagram for showing still another configuration of the timing adjusting mechanism.

As is shown in FIG. 1, the transmission lines 1a through 1e extend in the rightward direction in the drawing and then turn in the downward direction in the drawing, and hence have mutually different lengths. Also, the transmission lines 1a through 1e are provided with timing adjusting mechanisms (timing adjusting means) 10a through 10e, respectively. Each of these timing adjusting mechanisms 10a through 10e changes a signal transmission delay time of the corresponding transmission line. All the timing adjusting mechanisms 10a through 10e have the same configuration, which is exemplified in FIGS. 2(a) through 2(c). In the configuration shown in FIG. 2(a), six invertor delay circuits (delay devices) 20a through 20f each having a delay time τ are serially connected so that the timing adjusting mechanism can include a path 20g bypassing these six delay circuits 20a through 20f, a path 20h passing through the first delay circuit 20a alone, a path 20i passing through the first and second delay circuits 20a and 20b, a path 20j passing through the first through third delay circuits 20a through 20c, a pass 20k passing through the first through fourth delay circuits 20a through 20d, a path 20l passing through the first through fifth delay circuits 20a through 20e and a path 20m passing through all the delay circuits 20a through 20f. One of these seven paths 20g through 20m is selected by a selector (selecting circuit) 21, thereby adjusting the delay time of the corresponding transmission line in seven stages. This selector 21 is controlled in accordance with a delay value setting signal supplied from delay value setting means 19 described below. The number of the delay circuits is not limited to six. The configuration of the timing adjusting means 10a through 10e is not limited to that shown in FIG. 2(a), but a configuration shown in FIG. 2(b) is also adoptable. In this configuration, plural paths (delay devices) respectively having different lengths are selected by using plural (four in the exemplified case shown in FIG. 2(b)) selectors (selecting circuits) 22. The thus selected paths are serially connected, so that the delay time of the transmission line can be adjusted in accordance with the length of the resultant connected path. Alternatively, as is shown in FIG. 2(c), the timing adjusting mechanism can include plural (three in the exemplified case shown in FIG. 2(c)) delay devices 23, paths bypassing these delay devices and plural (three in FIG. 2(c)) selectors (selecting circuits) 24 for selecting them, so that the delay time of the transmission line can be adjusted in accordance with the number of delay devices 23 to be serially connected.

Furthermore, in FIG. 1, a reference numeral 15 denotes a master (synchronous cycle setting means), which is connected with the data inputting means 6. The master 15 judges whether or not a synchronous cycle for adjusting phase shifts between the data is to be started, periodically or on the basis of the data received by the data inputting means 6 through the transmission lines 1a through 1d. When it is judged that the synchronous cycle is to be started, the master 15 outputs a synchronous cycle judging signal.

Figure 6:
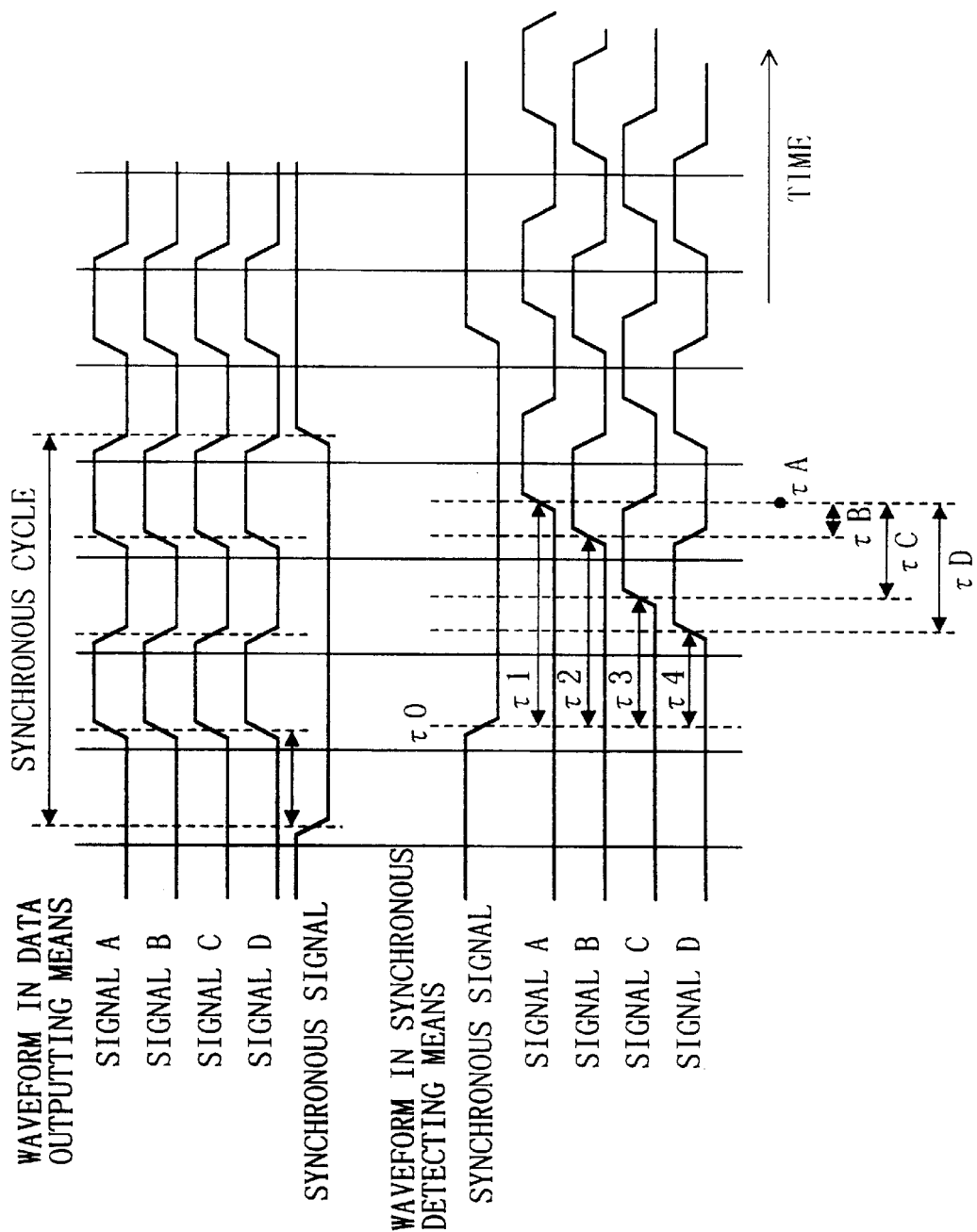
FIG. 6 is a diagram for explaining detection of delay times between plural signals in a synchronous cycle and determination of delay times to be inserted according to the embodiment.

Moreover, a reference numeral 16 denotes synchronous event generating means for generating a synchronous cycle signal in response to the synchronous cycle judging signal output by the master 15 when judged that the synchronous cycle is to be started. A reference numeral 17 denotes synchronous signal generating means for outputting a synchronous signal as is shown in FIG. 6 to the data outputting means 5 in response to the synchronous cycle signal generated by the synchronous event generating means 16. In this embodiment, the synchronous cycle is a period when the synchronous signal is at a low level as is shown in FIG. 6. The data outputting means 5 outputs the synchronous signal to the fifth transmission line 1e. The data generating means 4 simultaneously generates signals A through D as is shown in FIG. 6 in response to the synchronous cycle signal generated by the synchronous event generating means 16. The generating times of these signals A through D are delayed from the generation of the synchronous signal by predetermined periods of time as is shown in FIG. 6. The generated signals A through D are transmitted to the first through fourth transmission lines 1a through 1d by the data outputting means 5.

Figure 4:
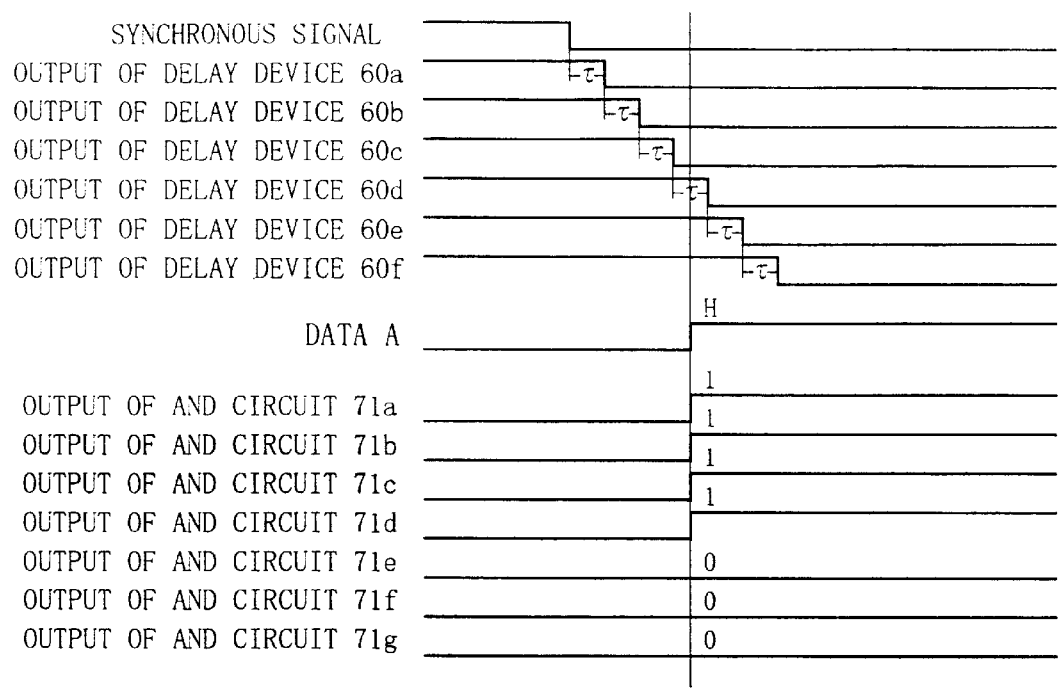
FIG. 4 is a diagram for explaining an operation of the synchronous detecting means of the embodiment.

In addition, a reference numeral 18 denotes synchronous detecting means for receiving the data and the synchronous signal transmitted through the transmission lines 1a through 1e in the synchronous cycle through the data inputting means 6, detecting the synchronous signal and calculating delay times τ1 through τ4 of the received four data on the basis of the time of the detection of the synchronous signal. The configuration of the synchronous detecting means (delay time detecting means) 18 is shown in FIG. 3. In FIG. 3, the configuration for dealing with the data A alone is shown and the configuration for dealing with the data B through D is omitted. As is shown in FIG. 3, the synchronous detecting means 18 includes serially connected six delay devices 60a through 60f each having a predetermined delay time τ, and the synchronous signal is input to the first delay device 60a. Also, the synchronous detecting means 18 includes seven two-input AND circuits 71a through 71g, and the first AND circuit 71a receives the synchronous signal and the data A. The second through seventh AND circuits 71b through 71g respectively correspond to the first through sixth delay devices 60a through 60f, so that each AND circuit can receive the output of the corresponding delay device and the data A. Accordingly, in the case as is shown in FIG. 4, the data A is input to the respective AND circuits 71a through 71g at a time between the outputs of the third and fourth delay devices 60c and 60d, namely, between the fall of a signal delayed from the synchronous signal by time 3τ and the fall of a signal delayed from the synchronous signal by time 4τ. Therefore, the outputs of the first through fourth AND circuits 71a through 71d alone are at a high level while the outputs of the fifth through seventh AND circuits 71e through 71g are at a low level. The combination of the outputs of these seven AND circuits (i.e., 1111000) indicates the delay time of the data A from the synchronous signal being 3τ. Similarly, a combination 11111000 indicates the delay time being 4τ, a combination 1110000 indicates the delay time being 2τ, a combination 1100000 indicates the delay time being τ, and a combination 1000000 indicates the delay time being "0".

Referring to FIG. 1 again, the master (delay value determining means) 15 receives the delay times τ1 through τ4 of the data transmitted through the transmission lines 1a through 1e detected by the synchronous detecting means 18, and determines delay values τA through τD to be respectively inserted into the first through fourth transmission lines 1a through 1d on the basis of these delay times τ1 through τ4. Such an operation of the master 15 will be described in detail below with reference to a flowchart of FIG. 5.

The reference numeral 19 denotes the delay value setting means for receiving the delay values τA through τD determined by the master 15 and outputting a delay value setting signal of several bits to the timing adjusting means 10a through 10d so that these delay values τA through τD can be inserted into the corresponding transmission lines 1a through 1d. In each of the timing adjusting means 10a through 10d, for example, having the configuration of FIG. 2(a), when the delay value setting signal specifies to set the delay time of 2τ, the selector 21 is selectively operated in accordance with the delay value setting signal so that the path 20i passing through the two delay circuits 20a and 20b can be selected. The master (delay value determining means) 15 and the delay value setting means 19 together form control means 50 according to this invention.

Now, the operations of the synchronous detecting means 18, the master 15 and the delay value setting means 19 will be described in detail with reference to the flowchart of FIG. 5.

Figure 5:
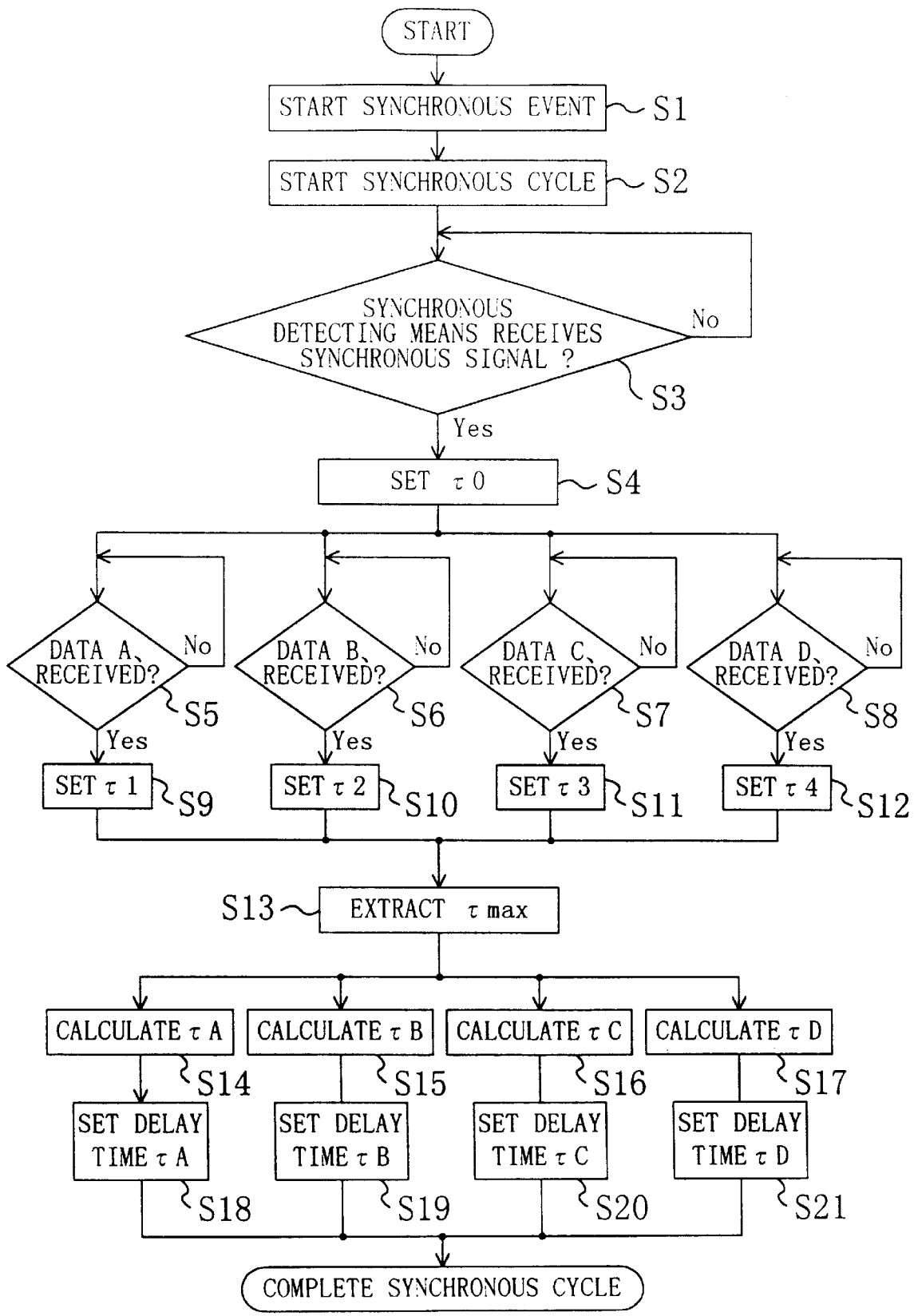
FIG. 5 is an exemplified flowchart for procedures of detecting delay times between plural signals in a synchronous cycle and determining delay times to be inserted according to the embodiment.

In the flowchart of FIG. 5, in a step S1, the master 15 judges that the synchronous cycle is to be started. This judgement is made, for example, every predetermined time. At this judgement, the synchronous event generating means 16 outputs the synchronous cycle signal, so as to start the synchronous event. In a step S2, the synchronous cycle is started in response to the start of the synchronous event. Specifically, the synchronous signal generating means 17 generates the synchronous signal at a low level as is shown in FIG. 6. The time period when the synchronous signal is at a low level is a period exceeding one cycle of a clock signal and specifically corresponds to four cycles of the clock signal as is shown in FIG. 6, which time period corresponds to the synchronous cycle. Also, the data generating means 4 generates the data A through D for testing as is shown in FIG. 6 when a predetermined time (for example, one cycle of the clock signal) has elapsed after the output of the synchronous signal at a low level. These data A through D and the synchronous signal are transmitted from the data outputting means 5 to the first through fifth transmission lines 1a through 1e, respectively.

Then, in a step S3, the synchronous detecting means 18 determined whether or not the synchronous signal at a low level has been received through the fifth transmission line 1e and the data inputting means 6. When the receipt of the synchronous signal is detected, the receipt of the synchronous signal is defined as a reference time τ for calculating the delay times of the signals transmitted through the transmission lines 1a through 1d in a step S4.

Subsequently, in steps S5 through S8, the synchronous detecting means 18 determines whether or not the four data A through D have been received through the first through fourth transmission lines 1a through 1d. When it is determined that these data have been received, the times τ1 through τ4 from the receiving time τ0 of the synchronous signal to the receipt of the respective data are calculated in steps S9 through S12, respectively.

After the step S12, in a step S13, the master (delay value determining means) 15 extracts the longest time from the times τ1 through τ4 (which is the time τ1 in the case of FIG. 6), and defines the time τ1 as a maximum time τmax. Next, in steps S14 through S17, the master 15 calculates differences between the maximum time τmax and the respective times τ1 through τ4, and defines phase shifts between the data A through D obtained through the calculation as τA (=τmax−τ1=0), τB (=τmax−τ2), τC (=τmax−τ3) and τD (=τmax−τ4). Then, in steps S18 through S21, the delay value setting means 19 sets the phase shifts τA, τB, τC and τD as delay times to be respectively inserted into the first through fourth transmission lines 1a through 1d, and controls the timing adjusting mechanisms 10a through 10d of the transmission lines 1a through 1d to be reset once and to be set at the delay times τA through τD, respectively. Furthermore, the delay setting means 19 controls the timing adjusting mechanism 10e so as to adjust the reference time τ0 of the synchronous signal if necessary, thereby adjusting the delay time of the fifth transmission line 1e. Then, the synchronous cycle is completed.

Next, the judgement on the start of the synchronous cycle by the master 15 will be described in detail. As described above, the master 15 measures a predetermined period and determines the start of the synchronous cycle periodically, namely, every predetermined period. For example, in an LSI with a power of 1 W, the temperature can be changed by 1° C. in 100 msec., and therefore, the synchronous cycle is executed every 100 msec. Alternatively, the master 15 can make the judgement as follows: In the case where the data of plural bits on the transmission lines 1a through 1d are provided with parity, a transmission error of the bit is detected, thereby determining that the synchronous cycle is to be started. In this case, after executing the synchronous cycle, the data with the transmission error is necessary to be transmitted again. Alternatively, as another method, the master 15 is provided with a bit correctable parity function, and when a bit transmission error is detected, the bit with the transmission error is corrected and then it is determined that the synchronous cycle is to be started. In this case, there is no need to transmit the data with the transmission error again. Moreover, as still another method, a temperature sensor is provided to at least one of the first and second LSI 2 and 3 and the transmission lines 1a through 1e, so that the synchronous cycle can be started when a predetermined temperature change is detected. For example, when the temperature is changed by 10° C., the signal skew results in a shift of several nanoseconds, and hence, the synchronous cycle is executed every time the temperature is changed by 10° C.

Figure 7A:
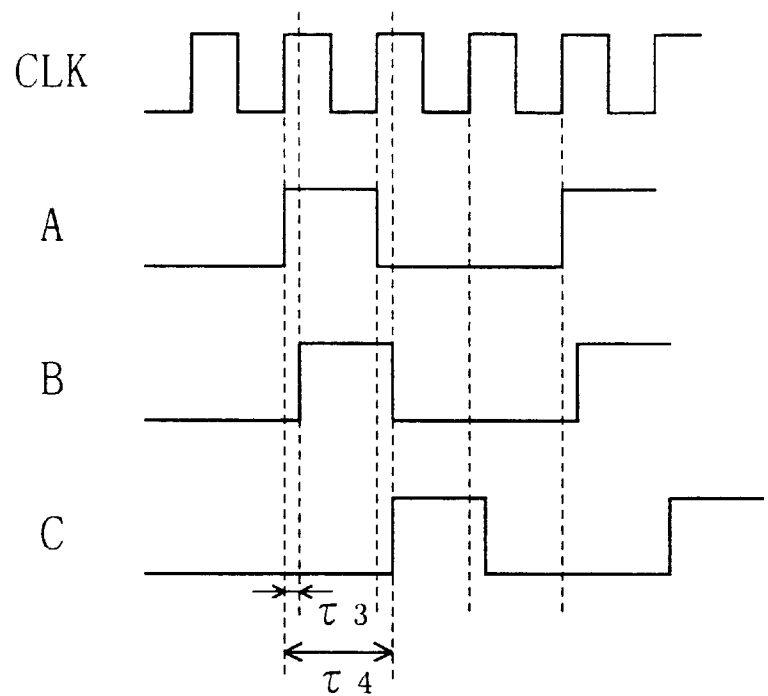
FIG. 7(a) is an explanatory diagram of phase shifts between signals A, B and C
Figure 7B:
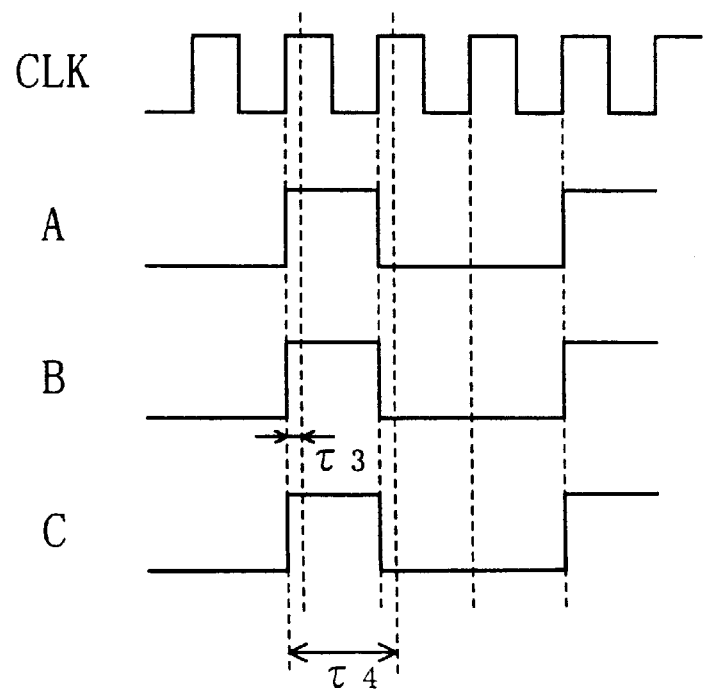
FIG. 7(b) is an explanatory diagram of the effect of the embodiment.

Accordingly, in this embodiment, when the synchronous cycle is set with its period defined as a period exceeding one cycle of the clock signal (for example, plural cycles of the clock signal), the differences in the transmission delay time between the signals A through D transmitted through the transmission lines 1a through 1d can be detected, so that the delay values equal to the delay time differences can be inserted into the corresponding transmission lines 1a through 1d. In this manner, for example, when the signal B is delayed from the signal A by a delay time shorter than 1 cycle of the clock signal and the signal C is delayed from the signal A by a delay time longer than 1 cycle of the clock signal as is shown in FIG. 7(a), both the signals B and C can be adjusted to be within the same clock period as the signal A as is shown in FIG. 7(b).

In the case where, for example, the first LSI 2 is a memory controller and the second LSI 3 is a memory, the configuration of one LSI (for example, the LSI serving as the memory) can be simplified by grouping the timing adjusting mechanisms 10a through 10e, the master 15, the synchronous event generating means 16, the synchronous signal generating means 17, the synchronous detecting means 18 and the delay value setting means 19 around the other LSI (for example, the LSI serving as the memory controller). In this case, a return pass for the signal is additionally required.

Also, the timing adjusting mechanisms 10a through 10e are provided to the transmission lines 1a through 1e, respectively in this embodiment, but it goes without saying that the timing adjusting mechanisms can be built in the first LSI 2, the second LSI 3, or both in the first and second LSIs 2 and 3. Furthermore, the timing adjusting mechanism 10e is provided to the fifth transmission line 1e in this embodiment, but this timing adjusting mechanism 10e can be omitted because the transmission line 1e is used for transmitting the synchronous signal (namely, a signal different from the primary signals to be adjusted for the phase shifts).

Moreover, the description is given on the case where plural signals are transmitted between the first and second LSIs 2 and 3 in this embodiment, but it goes without saying that the invention is applicable to signal transmission between a signal receiver part and a signal output part mounted on the same LSI (one chip).

Figure 8:
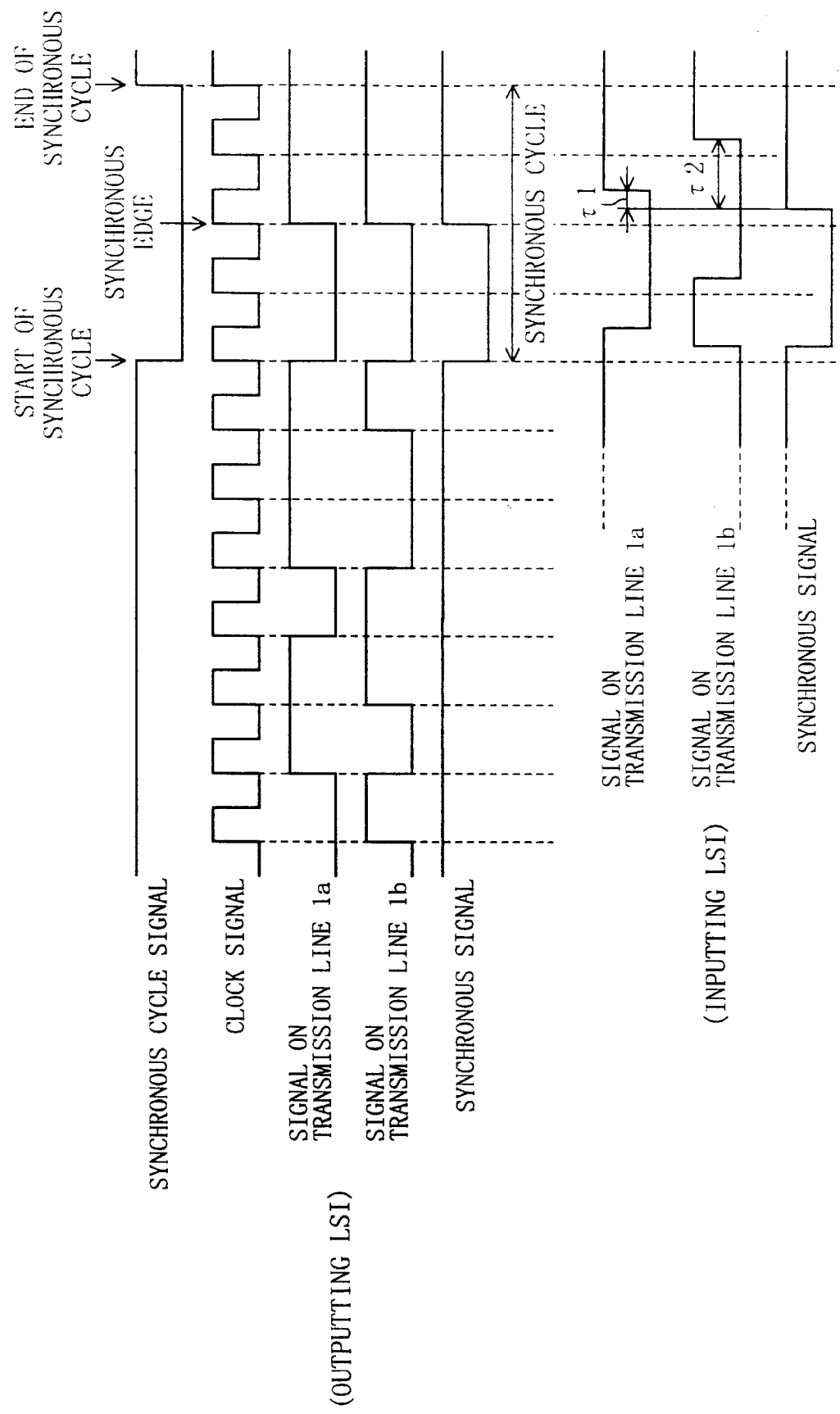
FIG. 8 is a diagram for showing a modification example of the synchronous cycle.

FIG. 8 shows another example of the synchronous cycle, testing data output in the synchronous cycle and a modification of the data. In the aforementioned embodiment, the synchronous cycle is defined as the period when the output synchronous signal is at a low level as is shown in FIG. 6. In contrast, in FIG. 8, the synchronous cycle is defined as a total period including a period when a synchronous signal at a high level constantly output to the fifth transmission line 1e is deactivated (corresponding to two cycles of the clock signal) and a period of the following two cycles of the clock signal. When the synchronous signal undergoes a high to low transition (i.e., at the start of the synchronous cycle), the data generating means 4 generates a signal having the same waveform as the synchronous signal, and this signal is transmitted to the transmission lines 1a through 1d by the data outputting means 5 (among which the signals to the transmission lines 1a and 1b alone are shown in FIG. 8). Accordingly, at the rise of the synchronous signal from a low level to a high level, a signal undergoing a low to high transition at this time point (synchronous edge) is simultaneously transmitted to the transmission lines 1a through 1d. These signals are retained at a high level until the end of the synchronous cycle (namely, during two cycles of the clock signal after the synchronous edge). Accordingly, the signals on the transmission lines 1a through 1d are not varied during a period of one clock cycle each before and after the synchronous edge (period margin). Therefore, even when a phase shift between two signals exceeds one cycle of the clock signal, the phase shift can be detected by detecting the receiving times of the signals on these transmission lines 1a through 1d within the same synchronous cycle by the synchronous detecting means 18. By setting the aforementioned period margin at two cycles or more of the clock signal, even when a phase shift between signals exceeds two cycles of the clock signal, a delay time between the signals can be detected.

Figure 9:
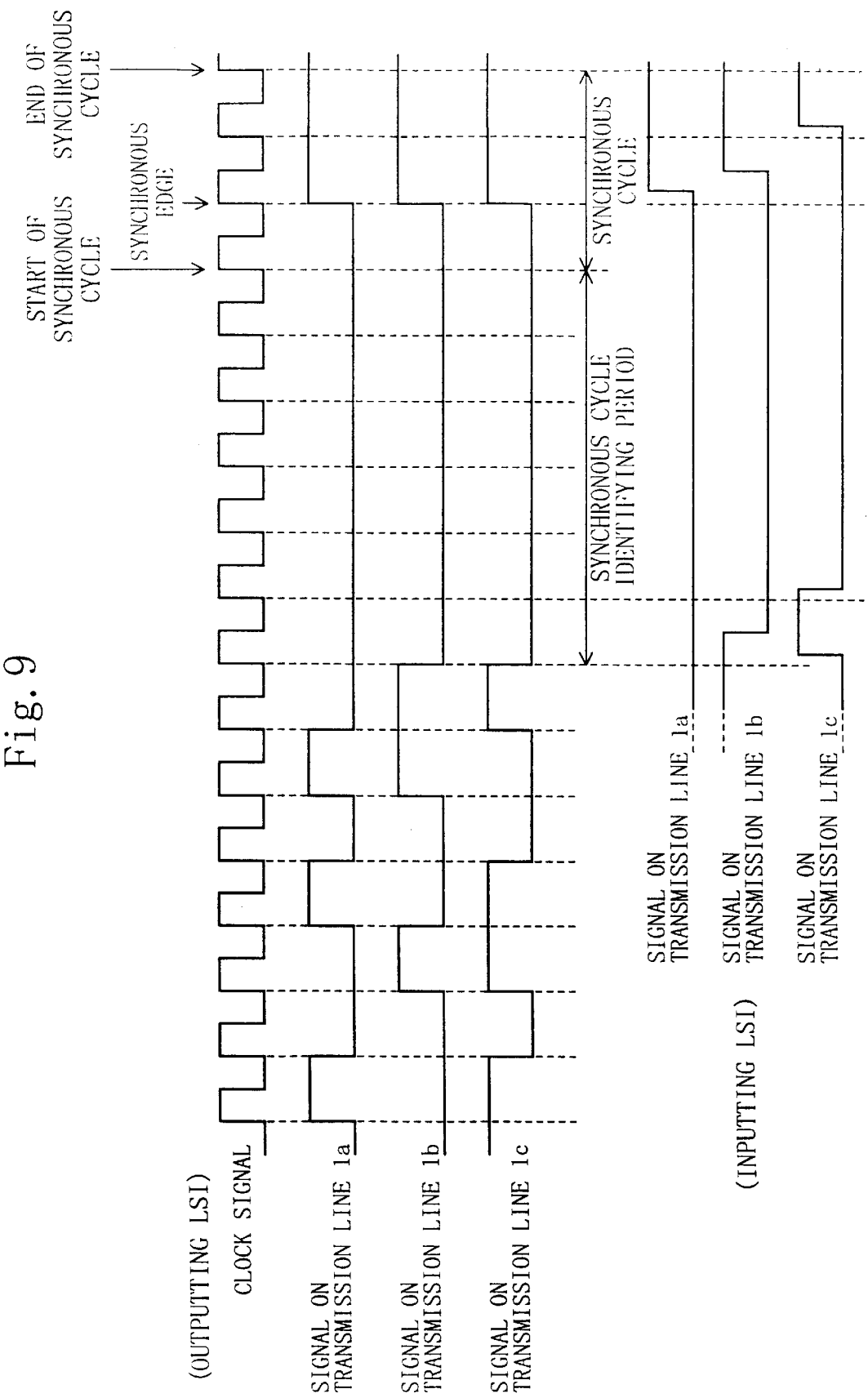
FIG. 9 is a diagram for showing another modification example of the synchronous cycle.

FIG. 9 shows still another example of the synchronous cycle. In the case shown in FIG. 9, when the synchronous event generating means 16 generates a synchronous cycle signal, the data generating means 4 generates a signal at a low level. This signal is retained at a low level during a predetermined number of cycles (six cycles in the case of FIG. 9) of the clock signal. This signal is transmitted to the transmission lines 1a through 1d by the data outputting means 5. The synchronous detecting means 18 detects that the signal has been retained at a low level for six cycles and identifies the time of the detection as a start of the synchronous cycle. In this example, the synchronous cycle corresponds to three cycles of the clock signal. Within this synchronous cycle, the data generating means 4 generates a signal at a high level at the synchronous edge in the second cycle of the clock signal, and the generated signal is transmitted to the transmission lines 1a through 1d by the data outputting means 5. This example has the advantage of not requiring the additional transmission line 1e for transmitting the synchronous signal as is adopted in the aforementioned embodiment.

Figure 10:
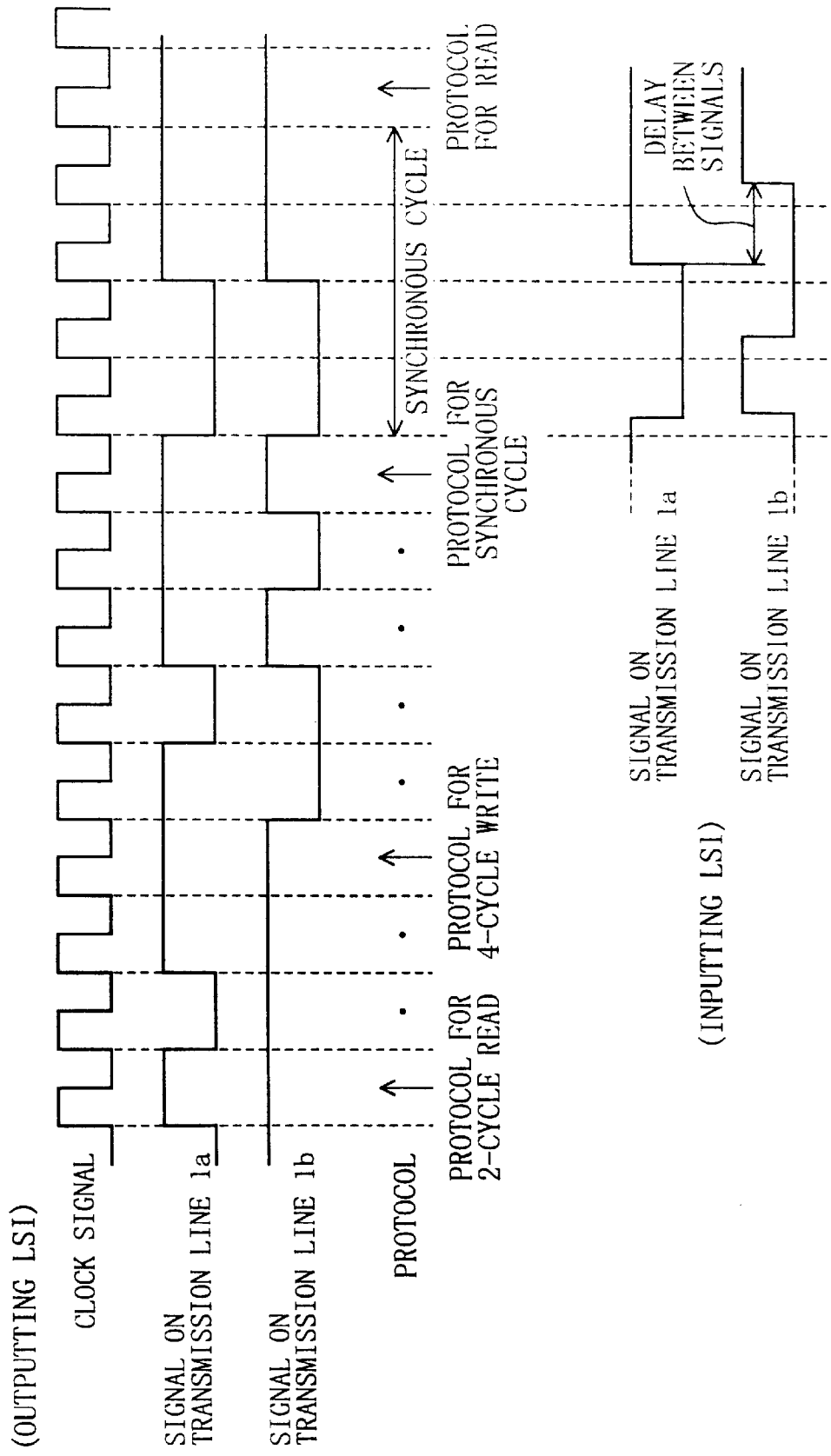
FIG. 10 is a diagram for showing still another modification example of the synchronous cycle.

FIG. 10 shows still another example of the synchronous cycle. In the case shown in FIG. 10, the first and second LSIs 2 and 3 transmit/receive signals in accordance with a predetermined protocol, and the LSIs 2 and 3 are placed in the synchronous cycle in response to output of a protocol for executing the synchronous cycle. One of the LSIs 2 and 3 or another circuit can output the protocol.

Figure 11:
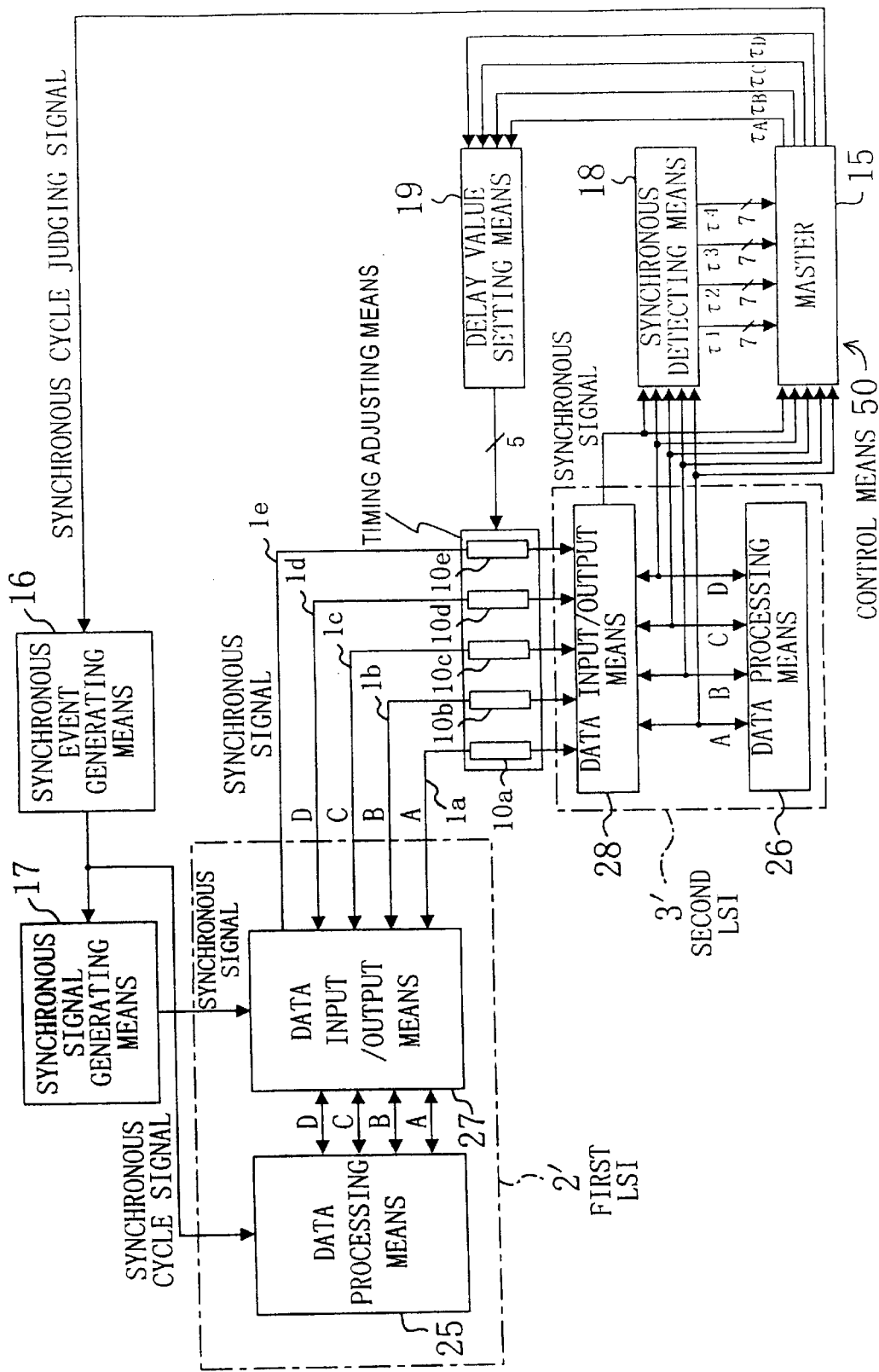
FIG. 11 is a diagram for showing a first modification of the embodiment.

FIG. 11 shows an adjusting device for delay times according to a modification of the aforementioned embodiment. The device of FIG. 11 additionally has a function to transmit signals from a second LSI 3' to a first LSI 2' as compared with that shown in FIG. 1. Specifically, the first and second LSIs 2' and 3' include data processing means 25 and 26 for generating and holding data and data input/output means 27 and 28, respectively. The rest of the configuration of this device is the same as that of the device shown in FIG. 1 and the description is omitted with like reference numerals used to refer to like elements.

Figure 12:
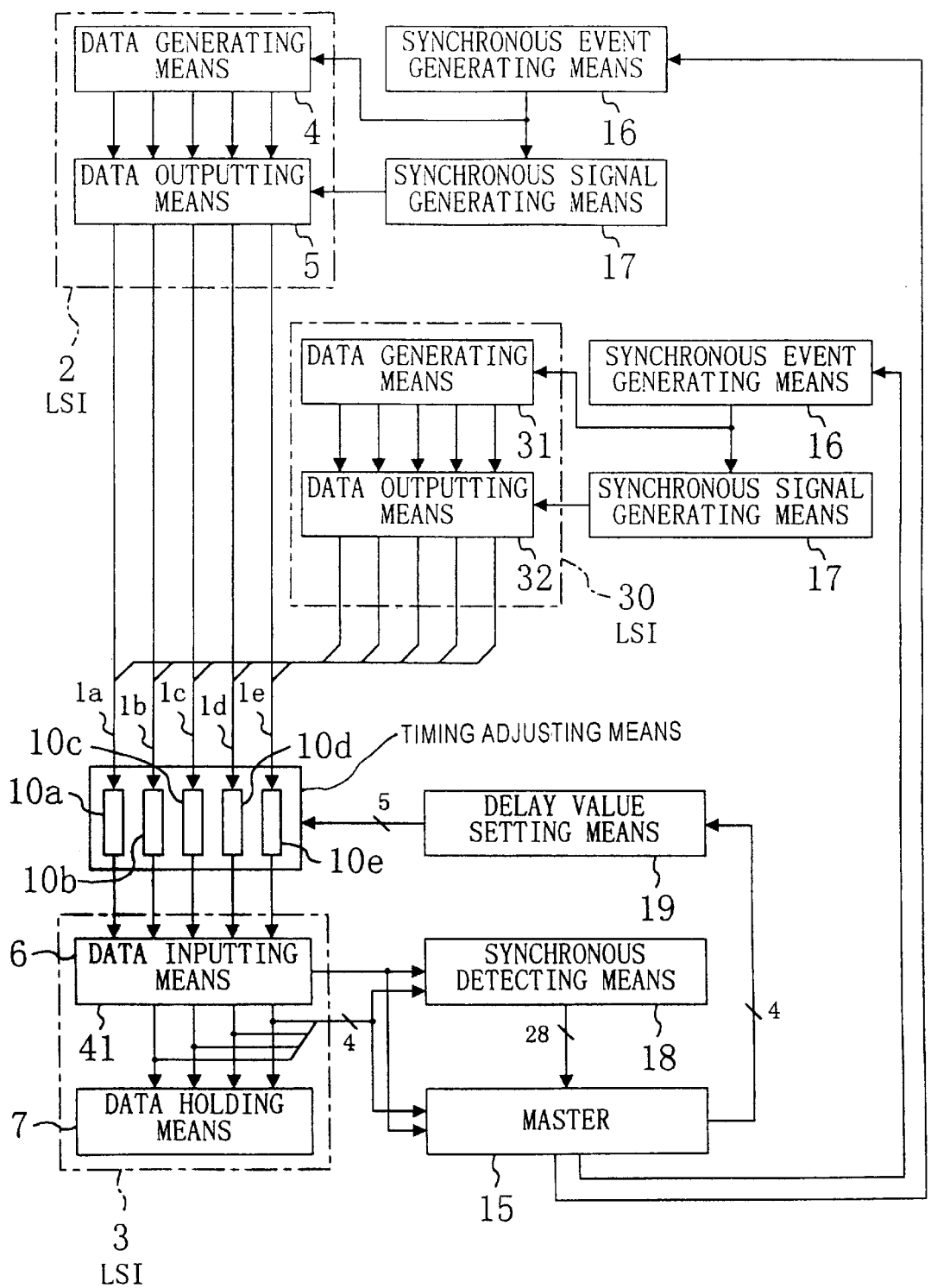
FIG. 12 is a diagram for showing a second modification of the embodiment.

Furthermore, FIG. 12 shows an adjusting device for delay times according to a second modification of the embodiment. The configuration of FIG. 12 is obtained by additionally providing, to the device shown in FIG. 1, a third LSI 30 connected with the first through fifth transmission lines 1a through 1e in parallel with the LSI 2 for outputting the signals. The third LSI 30 includes, similarly to the first LSI 2 described above, data generating means 31 and data outputting means 32. The synchronous event generating means 16 and the synchronous signal generating means 17 are additionally provided correspondingly to the third LSI 30. The rest of the configuration is the same as that of the aforementioned embodiment.

Figure 13:
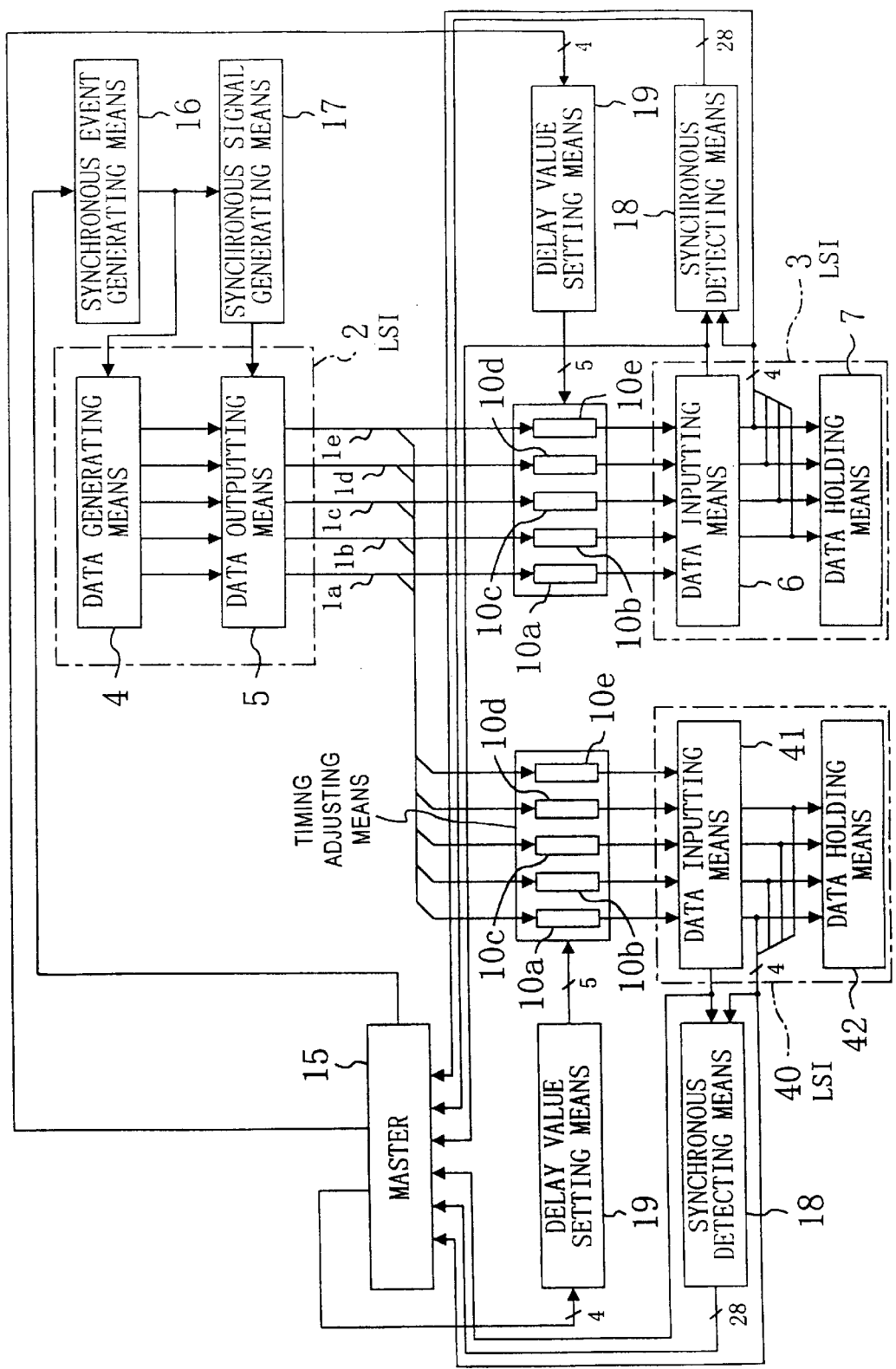
FIG. 13 is a diagram for showing a third modification of the embodiment.
Figure 14A:
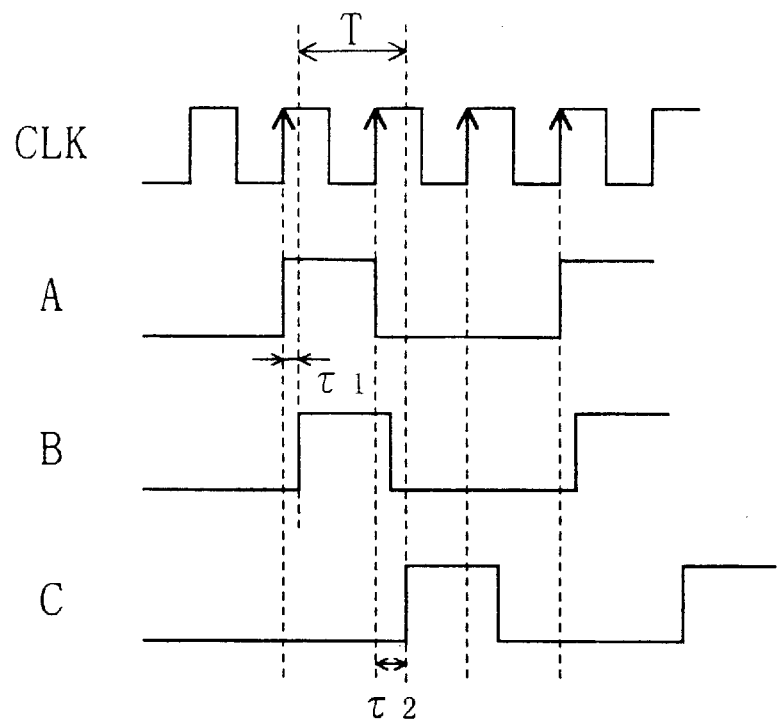
FIG. 14(a) is an explanatory diagram of phase shifts between signals A, B and C
Figure 14B:
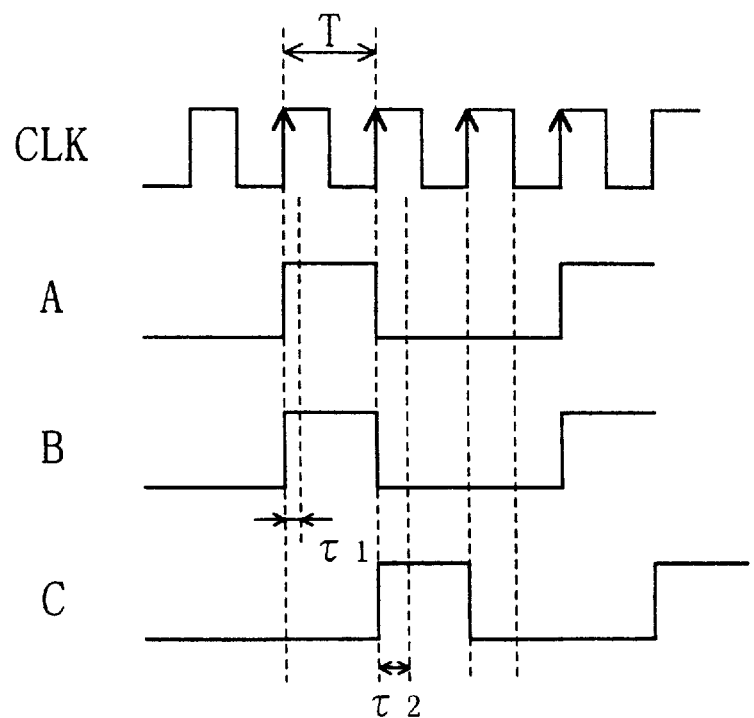
FIG. 14(b) is an explanatory diagram of conventional skew adjustment.

Moreover, FIG. 13 shows an adjusting device for delay times according to a third modification of the embodiment. The configuration of FIG. 13 is obtained by additionally providing, to the device of FIG. 1, a fourth LSI 40 connected with the first through fifth transmission lines 1a through 1e in parallel with the LSI 3 for inputting the signals. The fourth LSI 30 includes, similarly to the second LSI 3, data inputting means 41 and data holding means 42. The synchronous detecting means 18 is additionally provided correspondingly to the fourth LSI 40, and the transmission lines 1a through 1e connected with the fourth LSI 40 are additionally provided with the timing adjusting mechanisms 10a through 10e, respectively. These timing adjusting mechanisms 10a through 10e are adjusted for their delay values by the delay value determining means 19 additionally provided correspondingly to these timing adjusting mechanisms. The rest of the configuration is the same as that of the aforementioned embodiment.

The above description is given on the case where data are transmitted as signals to the respective transmission lines. It goes without saying that the invention is also applicable to the case where one and the same data or plural different data are transmitted to the transmission lines and the case where one and the same clock signal is used as the signal to be transmitted to the transmission lines.

What is claimed is:

1. An adjusting device for delay times between plural transmission lines comprising:

a signal output unit;

plural transmission lines connected with said signal output unit for simultaneously transmitting an output signal of said signal output unit based on a clock signal;

a signal receiver unit for receiving signals on said plural transmission lines;

plural timing adjusting means disposed on plural paths from said signal output unit through said plural transmission lines to said signal receiver unit for adjusting signal transmission delay times of said transmission lines;

synchronous cycle setting means for setting a synchronous cycle of a period exceeding one cycle of said clock signal;

delay time detecting means for detecting delay times between the signals on said transmission lines simultaneously output from said signal output unit and received by said signal receiver unit within said synchronous cycle set by said synchronous cycle setting means; and control means for controlling said plural timing adjusting means on the basis of the delay times between the signals on said transmission lines detected by said delay time detecting means.

2. The adjusting device for delay times between plural transmission lines of claim 1, wherein said control means includes:

delay time determining means for determining delay times to be respectively inserted into said transmission lines which make said signal receiver unit simultaneously receive the signals on said transmission lines on the basis of the delay times between the signals on said transmission lines detected by said delay time detecting means; and delay value setting means for controlling said plural timing adjusting means so as to insert the delay times determined by said delay time determining means into the corresponding transmission lines.

3. The adjusting device for delay times between plural transmission lines of claim 1, wherein said synchronous cycle setting means sets said synchronous cycle at a predetermined time interval.

4. The adjusting device for delay times between plural transmission lines of claim 1, wherein the signals are transmitted to said transmission lines with parity provided, and said synchronous cycle setting means detects a transmission error in a signal received by said signal receiver unit and sets said synchronous cycle when the transmission error is detected.

5. The adjusting device for delay times between plural transmission lines of claim 1, wherein a temperature sensor is disposed at least in one of said signal output unit, said signal receiver unit and said plural transmission lines, and said synchronous cycle setting means sets said synchronous cycle when said temperature sensor detects a temperature change exceeding a predetermined value.

6. The adjusting device for delay times between plural transmission lines of claim 1, wherein said synchronous cycle setting means sets said synchronous cycle by transmitting a synchronous signal to an additionally provided dedicated transmission line.

7. The adjusting device for delay times between plural transmission lines of claim 1, wherein said synchronous cycle setting means sets said synchronous cycle by fixing the signals simultaneously transmitted through said plural transmission lines at a predetermined potential level during a predetermined period.

8. The adjusting device for delay times between plural transmission lines of claim 1, wherein signal transmission between said signal output unit and said signal receiver unit is performed in accordance with a predetermined protocol, and said synchronous cycle setting means sets said synchronous cycle by outputting said protocol.

9. The adjusting device for delay times between plural transmission lines of claim 1, wherein said plural timing adjusting means respectively include plural delay devices and a selecting circuit for selecting a combination of said delay devices.

10. The adjusting device for delay times between plural transmission lines of claim 1, wherein said plural timing adjusting means are provided in the same number as the number of said plural transmission lines, with each timing adjusting means disposed on the corresponding transmission line.

11. The adjusting device for delay times between plural transmission lines of claim 1, wherein said delay time detecting means uses, as a reference, a signal on one transmission line received in said synchronous cycle by said signal receiver unit the last among the signals simultaneously output from said signal output means and received by said signal receiver unit, and detects delay times between said reference signal and the other signals on the other transmission lines.

12. The adjusting device for delay times between plural transmission lines of claim 1, wherein output of said output signal from said signal output unit is performed in accordance with a clock signal, and a period of said synchronous cycle set by said synchronous cycle setting means exceeds one cycle of the clock signal.

13. A method of adjusting delay times between plural transmission lines comprising the steps of:

setting a synchronous cycle of a period exceeding one cycle of a clock signal as a cycle for synchronizing signals on plural transmission lines;

simultaneously transmitting an output signal, based on said clock signal, of a signal output unit to said plural transmission lines and receiving the signals on said plural transmission lines by a signal receiver unit in said synchronous cycle;

detecting delay times between the signals on said transmission lines received by said signal receiver unit in said synchronous cycle; and adjusting delay times of said transmission lines on the basis of the detected delay times so that the signals on said transmission lines simultaneously output from said signal output unit are simultaneously received by said signal receiver unit.

14. The method of adjusting delay times between plural transmission lines of claim 13, wherein a period of the synchronous cycle exceeds one cycle of a clock signal.

* * * * *

UNITED STATES PATENT AND TRADEMARK OFFICE
CERTIFICATE OF CORRECTION

PATENT NO.    : 6,370,200 B1  
DATED         : April 9, 2002  
INVENTOR(S)   : Satoshi Takahashi It is certified that error appears in the above-identified patent and that said Letters Patent is hereby corrected as shown below:

<u>Title page,</u>
Item [56], FOREIGN PATENT DOCUMENTS, add
--     JP     06054016     2/1994
      JP     07073118     3/1995 --

Signed and Sealed this

Seventeenth Day of September, 2002

*Attest:*

*Attesting Officer*

JAMES E. ROGAN
*Director of the United States Patent and Trademark Office*